United States Patent [19]
Sugihara

[11] 4,080,622
[45] Mar. 21, 1978

[54] TELEVISION CAMERA
[75] Inventor: Yasumasa Sugihara, Kawasaki, Japan
[73] Assignee: The General Corporation, Japan
[21] Appl. No.: 588,719
[22] Filed: Jun. 20, 1975
[30] Foreign Application Priority Data
Oct. 16, 1974  Japan ............................ 49-118954
[51] Int. Cl.² .............................................. H04N 9/07
[52] U.S. Cl. ...................................... 358/44; 358/213
[58] Field of Search ................... 358/44, 41, 209, 212, 358/213; 178/7.1; 250/211 J; 357/24, 30
[56] References Cited
U.S. PATENT DOCUMENTS

| B 502,289 | 1/1976 | Chai ........................................ 358/41 |
| 3,904,818 | 9/1975 | Kovac .................................... 178/7.1 |
| 3,931,463 | 1/1976 | Levine ................................... 178/7.1 |

Primary Examiner—Howard W. Britton
Assistant Examiner—Mitchell Saffian
Attorney, Agent, or Firm—Robert E. Burns; Emmanuel J. Lobato; Bruce L. Adams

[57] ABSTRACT

A television camera including an image sensor comprising a photosensitive array of photoelements arranged in a matrix, selected photoelements storing photon produced charge in response to an image focussed onto the surface of the array, a signal from respective photoelements being sequentially read out to output means in the form of a packet of charge. A series of original signals obtained from the output means are divided into segment signals, adjacent segment signals being added together to provide an arithmetic mean which is used as one component signal of a television signal.

9 Claims, 12 Drawing Figures

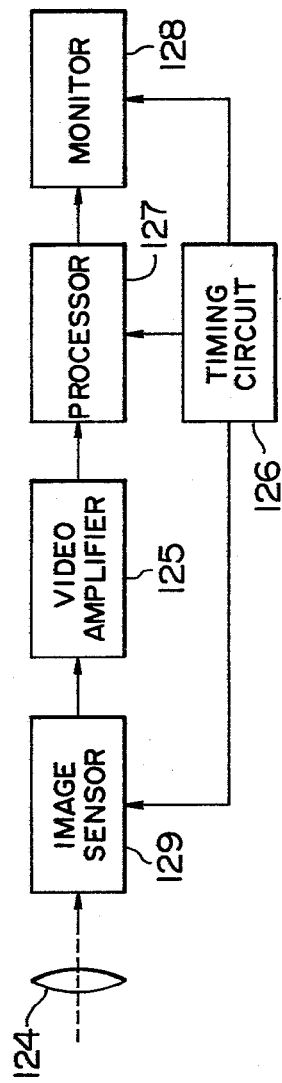
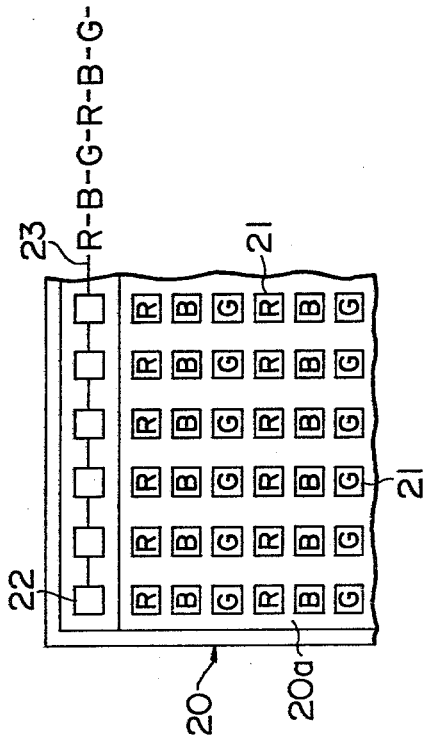
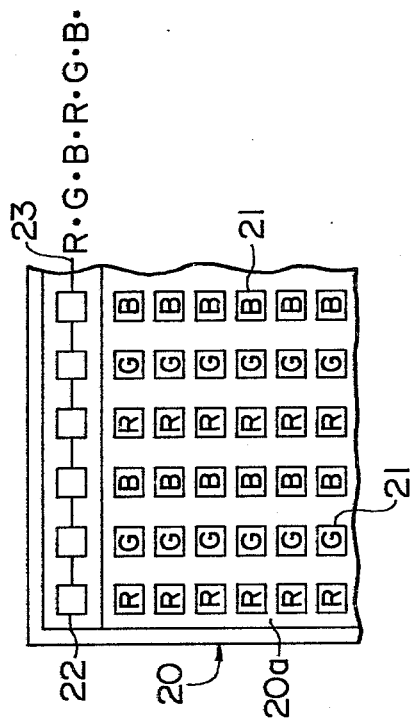

TELEVISION CAMERA

BACKGROUND OF THE INVENTION

The invention relates to a television camera, and more particularly to a color television camera employing a solid state image sensor.

A conventional color television camera includes a single or three pickup tubes, on the photocathode of which is focussed an image which is continuously scanned in both horizontal and vertical directions by a single electron beam in order to derive a video signal. The geometrical distortion of the resulting image is substantially determined by the linearity with which the electron beam scans. Where a plurality of pickup tubes are used, the respective electron beams must be synchronized in time and aligned in geometrical position, which requires a high level of skill. With a color television camera including three pickup tubes, an image information is separated into three color components by means of dichroic mirrors before it is converted into three color components. In this instance, the registration between the colors presents a significant problem. With a color television camera employing a pair of pickup tubes, one of the tubes is used for the brightness signal while the other is used for the color signals. For example, a stripe filter is used to derive red and blue signals, while the green signal is derived from the brightness signal and the red and blue signals by means of a matrix circuit. With a color television camera employing a single pickup tube, a complex stripe filter is used to derive the brightness signal and the color signals. It is well known that the color signals can be derived by the use of a stripe filter according to a phase or frequency separation technique incorporating a 1H delay circuit, where H represents the period of a horizontal scanning frequency. In a single tube color camera incorporating a stripe filter, the problem of the registration is avoided even though there may be problems associated with the image quality and interference patterns and moire resulting from the use of stripe filter. A stripe filter often comprises a combination of vertical or oblique stripes. A stripe filter comprising horizontal stripes has been proposed, but has not been practically embodied because of the technical difficulty of reliably scanning the electron beam along a thin horizontal stripe.

On the other hand, in the field of a black-and-white television camera, the use of a solid state image sensor utilizing semiconductor technology such as a recently developed charge-coupled device (CCD) or a charge transfer device in place of a pickup tube has been proposed. Such solid state image sensor or a black-and-white television camera using it are described in detail in "Imaging With Charge Transfer Devices", Session 2 of 1974 IEEE Intercon Technical Papers. Briefly, taking CCD which is one type of the solid state image sensor, it comprises a plurality of MOS (metal-oxide film-semiconductor) capacitors comprising semiconductor depletion layers which are arranged in a regular array of rows and columns. An image is optically focussed onto the photoelements of the surface to cause the individual depletion layers to store an electric charge which depends on the intensity of incident light thereon. The charge is sequentially transferred by a set of externally applied clock pulses or driving pulses having the same period, thereby reading out the image information as a video signal. Representing the time required for the stored charge to be transferred from one depletion layer to another by the clock pulse by $tc$, it will be appreciated that $tc$ is equal to the period of the clock pulse. Thus, the transfer time $tc$ can be chosen arbitrarily by changing the frequency of the clock pulse. Assuming that a horizontal row includes N electrodes for the respective depletion layers contained therein, it is seen that the time $T_D$ required to read out the charges of the row by transfer is given by:

$$T_D = N \times tc$$

The value of N and $tc$ can be chosen so that $T_D$ becomes equal to one horizontal scanning period of the standard television system, and the various parameters can be chosen such that the completion of transfer of one horizontal row is followed by the transfer of charge along a vertically adjacent next horizontal row so that the transfer in the vertical direction is completed within a period of time which is equal to one vertical scanning period of the standard television system, thus enabling such solid state image sensor to be utilized in place of a conventional pickup tube. As a matter of practice, the determination of N, $tc$ and other parameters must take into consideration the retrace time of the horizontal and vertical scanning lines. Such a solid state image sensor has a number of advantages including its compactness, light weight, low power dissipation and high reliability. Another significant feature as compared with a conventional pickup tube is its extremely small geometrical distortion of the image, as will be appreciated from its arrangement and principle of operation.

SUMMARY OF THE INVENTION

Therefore, it is an object of the invention to provide a novel color television camera which replaces a pickup tube by a solid state image sensor and which eliminates the above disadvantages found in the conventional color television camera.

It is another object of the invention to provide a circuit arrangement which improves the image quality in a television camera incorporating an image sensor.

In accordance with the invention, each of the photoelements which constitute the solid state image sensor are given a selective sensitivity to respond to light of a single color even though the entire arrangement of photoelements are sensitive to light of more than one colors. The photoelement which selects a required color for the color television is arrayed according to a predetermined pattern, and a precise clock pulse is used to effect the transfer according to a predetermined rule to provide a required color television signal. If required, the signal may be processed by an external electrical circuit.

The individual photoelements can be given an inherent color selectivity in a number of ways. In a first technique, the surface of a photoelement which is to have a red color sensitivity is applied with a paint which transmits only the light having the wavelength of a red color, as by evaporation or baking. Similarly, a paint which transmits only the light having the wavelength of a blue color is applied to the surface of the photoelement which is to have a blue color sensitivity, by the similar technique. In this manner, a particular color component of an image is made incident on a selected photoelement to cause a storage of an electric charge in its semiconductor depletion layer. In an alternative technique, a color filter is prepared having the same pattern as that of the color selectivity which is previously allotted to the individual photoelements in the plane of the image sensor, and is located in front of the latter. An object to be photographed is focussed onto the filter through a taking lens, and the image which is transmitted through the filter is focussed onto the surface of the photoelements of the image sensor through a relay lens. By coordinating the image sensor, relay lens and color filter previously, the photoelements can be given the color selectivity in the designed color array, thereby enabling a required color television signal to be derived. With the solid state image sensor, a color camera incorporating a color filter having horizontal stripes can be readily embodied, even though the achievement of such color camera has been considered as involving a technical difficulty in the case of a pickup tube because of the non-linearity resulting from the deflection of the electron beam.

As with the pickup tubes, the color television camera according to the invention may include one, two, three or four solid state image sensors. However, the present invention is principally effective when less than three image sensors are used. With a color television camera including a single image sensor, a dot filter or stripe filter is used to derive wide band three color signals from the image sensor. With a color television camera including two solid state image sensors, one image sensor is used for the brightness signal or the broad band green signal while the other image sensor is used for the remaining color signals. As is well recognized, the color television systems which are prevailing currently adopt the mixed highs scheme, so that the color signal has a narrow band, while the brightness signal has a wide band. By way of example, in the NTSC system, the brightness signal has a wide band width of approximately 4.2 MHz while a narrow band width of approximately 0.5 MHz is sufficient for the color signal. Thus, when an image sensor having 400 elements in a row and 500 elements in a column is used for the brightness signal, an array having 50 elements in a row and 500 elements in a column will be sufficient for practical purposes in order to derive the color signal. Since the resolution of the color signal may be made poorer than that of the brightness signal in the vertical direction also, the sensor for the color signal may have a reduced number of elements in a column such as 250 or 125 elements. Where 250 elements are provided in a column, the same photoelements may be used for the odd- and even-numbered fields. With 125 elements in a column, the same photoelements are used for both odd- and even-numbered fields and 1H delay circuit is used to cause the color signal from one row to correspond to a pair of horizontal scanning lines, which will be useful in manufacturing a color television camera inexpensively.

Within the solid state image sensor, individual photoelements are arranged in a regular array. Thus, a design can be employed in which their electrodes are divided into two or three groups according to a preselected rule so that separate clock pulse may be applied to each group to cause a read-out of the charge therein. In accordance with the invention, it is contemplated that two sets of clock pulses be applied to two groups or three sets of clock pulses be applied to three groups simultaneously to perform a transfer of the charge, thereby deriving two or three trains of simultaneous signals. At this end, a dot filter or stripe filter can be used to divide the photoelements of a single image sensor into two groups corresponding to red and blue colors, the group for the red color being joined together so as to permit a transfer of the charge with a single set of clock pulses. Similarly, the group for the blue color is also joined together to permit a transfer of the charge by another set of clock pulses. By effecting a transfer for the red and blue colors simultaneously, it is possible to derive red and blue signals simultaneously. If desired, the respective sets of clock pulses can be adjusted so as to provide a given time interval between the transfer of the respective groups. The ability of dividing a single image field into more than one group so as to derive separate signals with a fixed time relationship therebetween has not been achievable with the conventional pickup tube system. By utilizing such feature, the invention provides a simple, inexpensive and high quality system of taking pictures with a color television camera.

As mentioned previously, since the solid state image sensor comprises a regular array of finely divided photoelements arranged in rows and columns, from which the charge stored in the depletion layers are regularly transferred by means of clock pulses which have an accurate time definition, the linearity and the geometrical distortion of the image can be highly improved as compared with that obtained by the use of the pickup tube. The nonlinearity or geometrical distortion of an image in the solid state image sensor is attributable to the misalignment in the array of the photoelements and to the optical lens system used in taking pictures, but either of which is negligibly small as compared with those of the pickup tube. Since the linearity and geometrical distortion in the solid state image sensor are determined uniquely by the geometrical arrangement of the photoelements and the optical lens system, the invention enables a color camera having little color missregistration or a color camera which is compact, light weight and simple in arrangement and circuit to be produced.

BRIEF DESCRIPTION OF THE DRAWINGS

The above and other objects, features and advantages of the invention will be better understood from the following description of embodiments thereof with reference to the attached drawings, in which:

FIG. 2 is a block diagram of a known television camera incorporating an image sensor;

FIG. 3 is a schematic illustration, substantially in top view, of a dot sequential array of photoelements constituting an image sensor which is used for the color television camera according to the invention;

FIG. 4 is a similar view to FIG. 3, but illustrating the array of photoelements in a line sequential system;

DESCRIPTION OF THE PREFERRED EMBODIMENTS

Figure 1A:
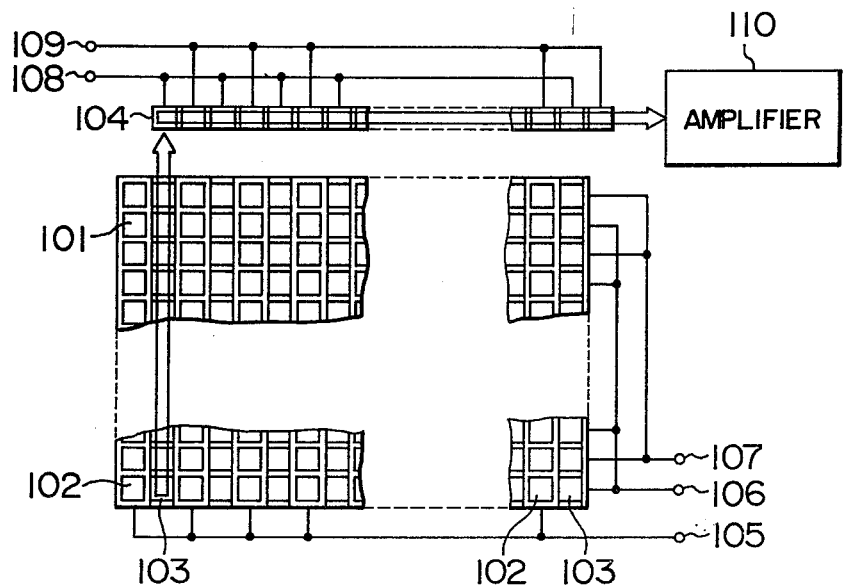
FIGS. 1a and 1b are block diagrams illustrating two examples of known image sensor.

Before proceeding with the detailed description of the invention, known image sensors will be described first with reference to FIG. 1 in order to permit a better understanding of the present invention. The image sensor shown in FIG. 1a is a model manufactured by Fairchild Camera and Instrument Corp., State of California, comprising columns 102 of a plurality of photoelements 101, which columns are alternately arranged with analog shift registers 103 for vertical transfer, the respective final stages of the vertical transfer registers 103 being connected with the respective stages of a horizontal output analog shift register 104. For the sake of convenience, the direction of transfer is indicated by arrows. An electric charge is stored in a depletion layer underlying a photoelement 101 in accordance with the intensity of an irradiating light, and is transferred into a vertical transfer register 103 when a signal from a terminal 105 is applied to an electrode thereof. In the present example, two phase clock pulses are applied to terminals 106 and 107, respectively, to cause a transfer of the charge in the vertical transfer registers 103, one row at a time, to the output register 104. The charge which is transferred to the output register 104 is read out in a horizontal direction by clock pulses applied to terminals 108 and 109, and is eventually fed into an output amplifier 110. The frequency of the horizontal transfer clock exceeds the product of the vertical transfer frequency and the number of the stages in the output registers 104.

Figure 1B:
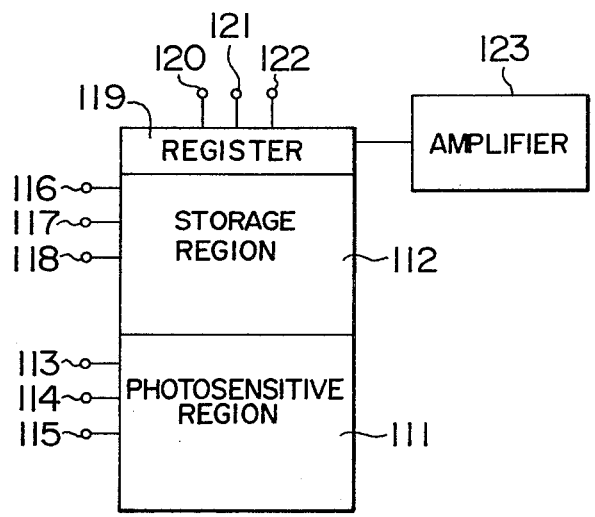

FIG. 1b shows another image sensor which is a model manufactured by RCA Corp. The image sensor is shown in greatly simplified form, and comprises a photosensitive region 111 having a common horizontally extending electrode, and a storage region 112 of a similar construction which is separated therefrom. The photoelements in the photosensitive region 111 are arranged in an array in a similar manner as mentioned above, except that the photoelements have a common horizontally extending electrode and that their charge is transferred through the respective depletion layers without being transferred to a transfer register. The charge generated in the photosensitive region 111 is transferred to the storage region 112 by means of clock pulses applied from terminals 113, 114 and 115, and the transferred charge in the storage region is carried to a horizontal output register 119 by means of clock pulses applied to terminals 116, 117, 118. Subsequently, clock pulses are applied to terminals 120, 121, 122 to read out in the horizontal direction to feed an output amplifier 123.

The basic operation of an image sensor including charge-coupled device or charge transfer device as exemplified by the above examples is as follows:

1. Photon generated charge is stored in an array of depletion layers or potential barriers formed by MOS capacitors; and 2. A signal in the form of a packet of charge is transferred from each element of the array to a detector through a series of potential wells.

FIG. 2 shows a block diagram of a television camera incorporating an image sensor. An image sensor 129 functions, in place of a conventional pickup tube, to receive an image through an optical system 124, and to feed its image information to a video amplifier 125. It will be noted that the image sensor 129 is supplied with a drive signal from a timing circuit 126. The output of the video amplifier 125 is fed to a processor 127 together with a blanking and sync signal supplied from the timing circuit 126. The output of the processor is supplied to a monitor 128.

In the following Figures are shown several embodiments of the color television camera according to the invention which, for the purpose of convenience, are illustrated as arranged according to the NTSC system. However, it will be appreciated by those skilled in the art that the invention is not limited to the NTSC system, but is equally applicable to the PAL or SECAM systems. In the description to follow and in the drawings, reference characters "R", "G" and "B" are used to denote "red", "green" and "blue", respectively. While these reference characters may sometimes represent the color itself and the corresponding color signal in other instances, a confusion therebetween could be avoided since they are distinctly referred to where needed. It should be understood that the denotation of R, G and B for the red, green and blue color is merely a convenience of description, and may represent other colors.

Referring to FIG. 3, there is shown one embodiment of the invention which is constructed as a color television camera of a dot sequential type. In this Figure, only a portion of a photosensitive array 20a comprising a plurality of photoelements 21 distributed throughout an image sensor 20 is illustrated. In an actual image sensor, the photosensitive array 20a will alternate with vertical transfer registers if the image sensor 20 is constructed according to the principle illustrated in FIG. 1a, or the photosensitive array 20a will be connected with a storage array if the sensor is constructed according to the principle illustrated in FIG. 1b. However, in any event, an electric charge which is stored in a depletion layer underlying a photoelement 21 and having a magnitude in accordance with the intensity of an irradiating light is read out in a sequential manner, so that these associated elements are omitted from illustration except an output register 22 and its associated output line 23.

According to the invention, the photoelements 21 of the image sensor 20 is each made sensitive to light of a single color, even though the assembly of the photoelements is sensitive to light of more than one color. The manner in which each photoelement 21 is given a color selectivity has been mentioned previously. In the embodiment shown in FIG. 3, the photoelements 21 of a single horizontal row are given a regular color selectivity in the sequence of R, G, B, R, G, B and so on, by the provision of dot filters, for example. As a consequence, the photoelements 21 of a single vertical column have the same color selectivity. The charges stored in the respective photoelements 21 are simultaneously transferred in the vertical direction by a single set of clock pulses, and the charges in the photoelements 21 of the final stage or row are transferred to the output registers 22, from which a read-out is made sequentially in the horizontal direction. In this manner, a dot sequential signal in the sequence of R, G, B, R, G, B is obtained from the output line 23 which can be separated into individual R, G and B color signals in an external circuit by using sampling pulses. The only requirement concerning the arrangement of colors among the photoelements 21 is that it maintains a fixed sequence. Any number of colors in excess of one may be used. It will be noted that the sequence of color selectivity of the respective photoelements 21 may be changed from horizontal row to horizontal row.

FIG. 4 schematically illustrates an image sensor for a color television camera of line sequential type, which is depicted in the similar manner as in FIG. 3. In the present example, the photoelements 21 in odd-numbered rows have the color selectivity in the sequence of R, G and B, while those in even-numbered rows have the color selectivity in the sequence of B, R and G. The transfer of charges takes place for each column by a set of clock pulses, but each column is associated with a pair of transfer channels, the charges stored in those photoelements 21 which are included in an odd-numbered row being transferred alone in an odd-numbered field and the charges stored in those photoelements 21 which are included in an even-numbered row being transferred in an even-numbered field. The provision of such a pair of transfer channels in association with a single photosensitive array is in itself known as disclosed in the IEEE intercon technical papers referred to above. The change from one transfer channel to the other for each successive field results in the same effect as achieved in a normal interlaced operation, allowing a line sequential signal in the sequence of R, G and B to be read out from the image sensor 20. The conversion of the R, G and B line sequential signals into a simultaneous signal is described, for example, in British Pat. No. 1,162,003.

In the NTSC system, the number of scanning lines is 525 and a 1:2 interlaced system is adopted. Assuming a vertical retrace period of 21H (H being one horizontal scanning period), the retrace time for a pair of odd- and even-numbered fields will be 42H, so that if the arrangement shown in FIG. 3 is applied, there must be 525 − 42 = 483 rows. It will be appreciated that the provision of about 500 rows will be more than sufficient to produce an interlaced signal.

Figure 5:
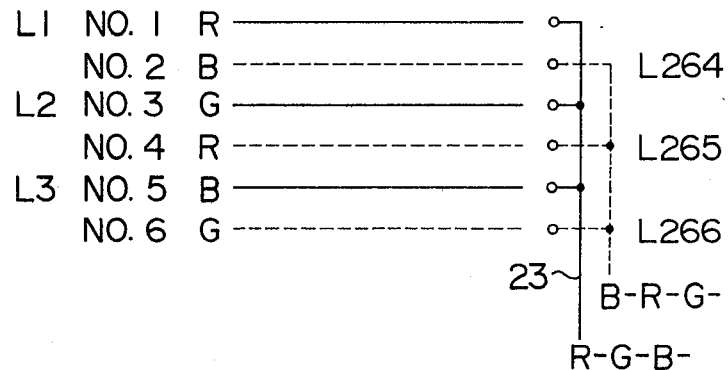
FIG. 5 is a schematic illustration of part of FIG. 4 in which one odd-numbered horizontal row of photoelements shown in FIG. 4 is represented by a single solid line and one even-numbered row of photoelements is represented by a single broken line, illustrating that the solid line corresponds to each scanning line of an odd-numbered field and a broken line corresponds to each scanning line of an even-numbered field.

FIG. 5 is a simplified illustration of the photoelements 21 shown in FIG. 4, an odd-numbered row being indicated by a solid line and an even-numbered row being indicated by a dotted line. For the convenience of description, the output registers are omitted from the illustration, and instead the output line 23 is shown to indicate that the charges of the respective rows are read out in turn. Such a simplified illustration will facilitate an understanding of the interlaced operation. In this Figure, the reference character L followed by an Arabian number represents the number of a horizontal scanning line while the denotation No. represents the number of the row of the photoelements.

Figure 6:
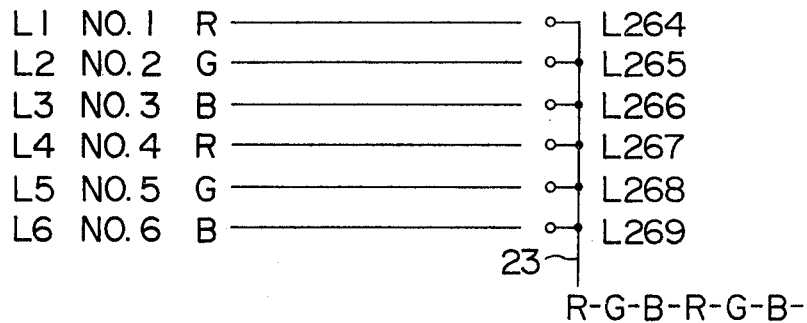
FIG. 6 is a schematic illustration of an embodiment which is similar to that shown in FIG. 5 except that each horizontal row of photoelements is represented by a single solid line and corresponds to each scanning line of an odd- and an even-numbered field.

FIG. 6 shows a similar simplified illustration of FIG. 5 wherein each row of the photoelements is represented by a solid line. The line number of the scanning line is indicated on the opposite sides of the solid line. As will be apparent, both odd- and even-numbered fields use the same photoelements in this example. As a consequence, there is no need to provide a pair of transfer channels as indicated in FIG. 4, but the charges for the respective columns may be transferred in sequence. As a result, a line sequential signal in the sequence of R, G and B is obtained from the output line 23. In the NTSC system, there may be provided 250 rows of photoelements for reduction to practice of the invention, but the lack of the interlaced scanning may result in a degradation of the vertical resolution. However, such a disadvantage can be compensated for by processing the output signal in an external circuit.

Figure 7:
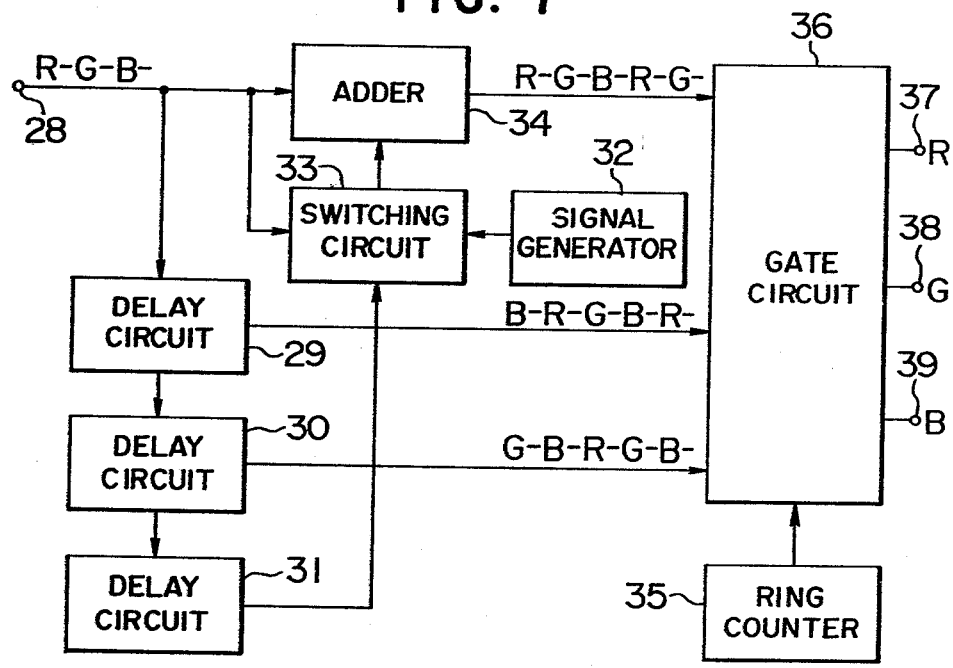
FIG. 7 is a block diagram of a circuit for improving the interlaced scanning effect for the color television camera incorporating an image sensor having an array of photoelements as shown in FIG. 6.

FIG. 7 shows a circuit for improving the interlaced scanning effect which is preferred for use with the image sensor shown in FIG. 6. An input terminal 28 is adapted to receive a line sequential signal in the sequence of R, G and B, and is connected with 1H delay circuits 29, 30 and 31 successively. A signal generator 32 for switching between an odd- and an even-numbered field is connected with a signal switching circuit 33 which is in turn connected with an adder 34. A ring counter 35 which produces one pulse for a 3H interval is connected with a signal gate circuit 36 which is provided with output terminals 37, 38 and 39 for continuous R, G and B signals, respectively. Describing initially the operation of the signal generator 32, switching circuit 33 and adder 34, it will be understood that the signal supplied from the terminal 28 to the switching circuit 33 is of the same color as the signal fed from the delay circuit 31, but there is a time delay of 3H therebetween. By an adjustment of the polarity of the pulse from the signal generator 32, the switching circuit 33 is made to select the signal fed from the terminal 28 for input to the adder 34 during an odd-numbered field and to select the signal supplied from the delay circuit 31 for input to the adder 34 during an even-numbered field. Thus, the output from the adder 34 is the signal on each scanning line in the direct form during an odd-numbered field, but is an average of signals on two adjacent lines of the same color (involving a time delay of 3H therebetween) during an even-numbered field. The combination of the delay circuits 29, 30, the ring counter 35 and the switching circuit 36 serves for converting the line sequential signal of R, G and B into a simultaneous signal of R, G, and B. Such conversion is known as disclosed in the previously cited British Patent and therefore will not be described in detail. By varying the number of rows of photoelements combined for the color corresponding to each scanning line during an odd- and an even-numbered field, there can be achieved an improvement in performance.

Figure 8:
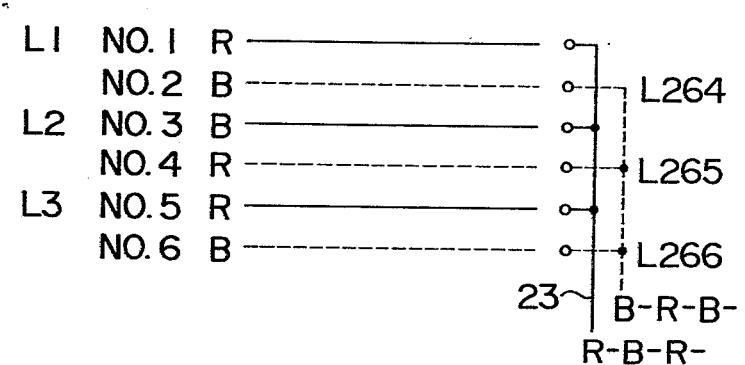
FIGS. 8 and 9 are schematic views showing modifications of the arrangement shown in FIGS. 5 and 6, respectively.
Figure 9:
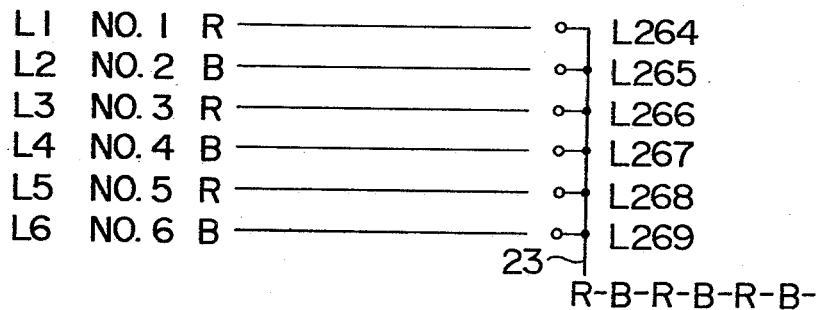

FIGS. 8 and 9 show modifications of the arrangements shown in FIGS. 5 and 6, respectively, illustrating techniques for deriving a two color line sequential signal from the output line 23. Such a technique is principally used to produce color signals with a color television camera which incorporates a pair of solid state image sensors.

Figure 10:
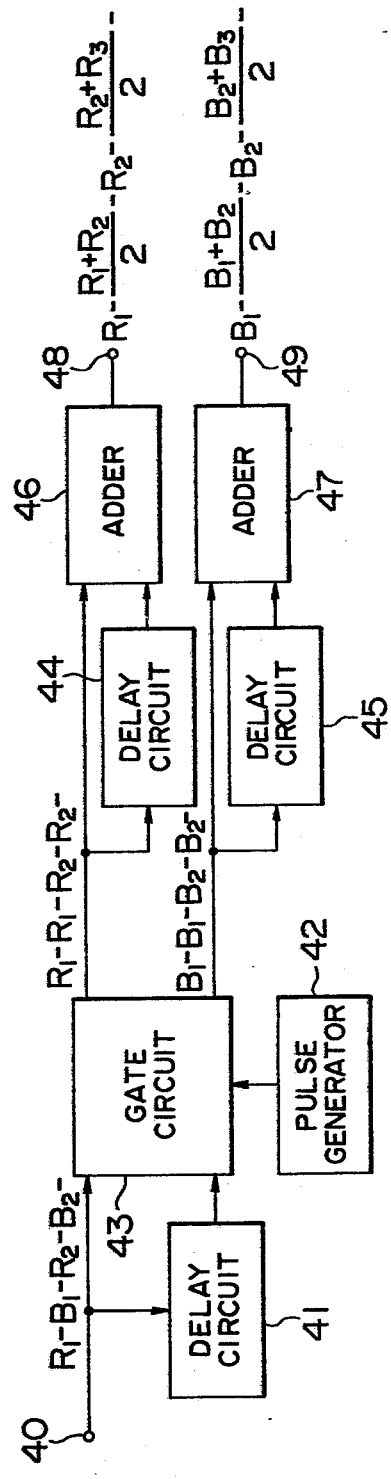
FIG. 10 is a block diagram of a signal compensation circuit which is used when an image sensor having an array of photoelements as indicated in FIGS. 8 or 9 is employed.

FIG. 10 shows an image quality improving circuit which may be used with an image sensor outputting a two color, line sequential signal, as illustrated in FIG. 8 or 9. An input terminal 40 is adapted to receive a line sequential signal in the sequence of R1, B1, R2, B2 . . . . . Reference numeral 41 represents a 1H delay circuit as do reference numerals 44 and 45. A gate pulse generator 42 feeds a signal gate circuit 43 which in turn feeds a pair of adders 46 and 47 having associated output terminals 48, 49 for the R signal and B signal, respectively. The circuit portion comprising the elements 41, 42 and 43 constitutes a known conversion circuit for converting a line sequential signal to a simultaneous signal. The output of the gate circuit 43 is in the form a pair of simultaneous signals in the form of trains R1, R1, R2, R2 ..... and B1, B1, B2, B2 ..... Since each of the trains includes the same signal repeated twice, its passage through the circuit portion comprising the delay circuit 44 and the adder 46 produces an average of signals on two immediately adjacent scanning lines as an output, for example, producing an R signal in the form of R1, (R2 + R2)/2, (R2 + R3)/2 and so on. In the former arrangement, the interval during which B1 is being scanned is supplemented by R1 which is delayed by 1H, but in the present system, the image quality is improved by supplying an interpolated component of (R1 + R2)/2.

Figure 11:
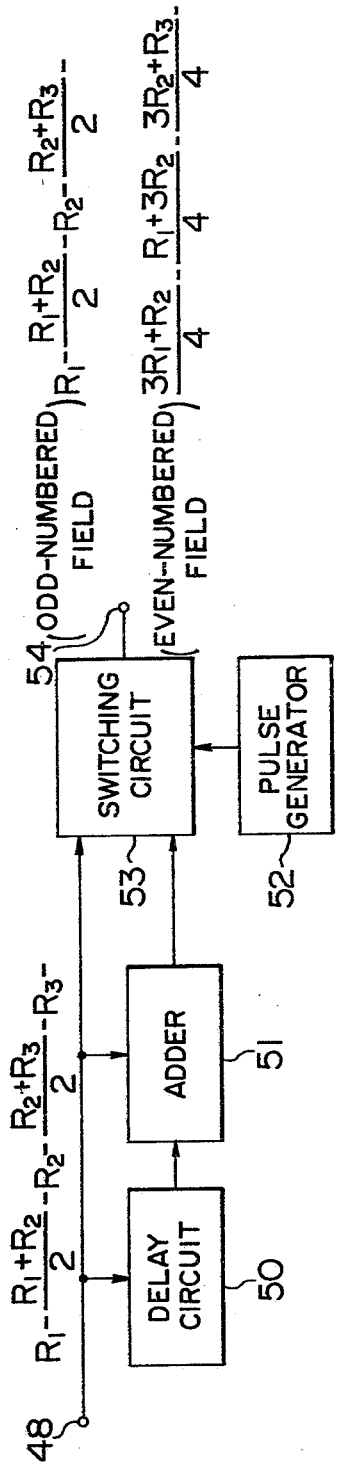
FIG. 11 is a block diagram of a circuit for improving the interlaced scanning effect which can be used in addition to the signal compensation circuit shown in FIG. 10.

FIG. 11 shows an additional circuit which is added to the circuit of FIG. 10 when an image sensor such as illustrated in FIG. 9 is used in order to improve the interlaced scanning effect. The terminal 48 refers to the same output terminal for the R signal illustrated in FIG. 10. This terminal is connected with a 1H delay circuit 50, an adder 51 and a signal switching circuit 53 which is also fed from a pulse generator 52 which produces a pulse for switching between an odd- and an even-numbered field. Since the input signal at the terminal 48 is a consecutive train of R signals in the form of R1, (R1 + R2)/2, R2, (R2 + R3)/2 ...., the output after passing through the delay circuit 50 and the adder 51 will be in the form of (3R1 + R2)/4, (R1 + 3)/4, (3R2 + R3)/4 .... which are delayed by 1H. By operating the signal switching circuit to pass the output at the terminal 48 directly to an output terminal 54 during an odd-numbered field and to pass the output from the adder 51 to the output terminal 54 during an even-numbered field, an improved interlaced scanning is achieved.

While the arrangements of FIGS. 10 and 11 have been described in terms of a line sequential signal, the similar arrangement can be applied to a dot sequential signal. In this instance, it will be obvious to one skilled in the art that the desired result can be obtained by changing the time delay and frequency of the switching pulse. The circuit shown in FIG. 11 is directly applicable to the brightness signal, and even though the brightness signal is not subjected to a normal interlaced scanning as exemplified by FIG. 6, the output signal will be still improved in respect of the interlaced scanning.

While the invention has been shown and described in connection with several embodiments thereof, it should be understood that the disclosure given herein is illustrative only, but not limitative of the scope of the invention. It will be appreciated that in the television system employing 1:2 interlaced scanning scheme, an odd-numbered field ends at a ½H point where an even-numbered field starts, so that the image sensor may include a corresponding arrangement of photoelements. However, such an arrangement has no direct bearing with the essential teaching of the invention and therefore is not described. It will be appreciated that an extra number of rows may be provided and disposed of by a blanking signal.

In this manner, the invention provides a color television camera which is very compact and light weight and still reliable in operation. It is contemplated that the apparatus according to the invention may be integrally combined with an image recorder so as to form a portable camera.

Having described the invention, what is claimed is:

1. A television camera comprising a. an image sensor comprising an array of elements disposed in rows which correspond to horizontal scanning lines of an odd and an even-numbered field of a television signal, each of the elements being responsive to excitation by light to produce and store an electric charge, and means for successively reading said charge as an electric voltage or current corresponding to the charge from each row of the elements within a time interval corresponding to the period of one horizontal scanning line, b. means for obtaining an original signal from said reading means, c. means for forming a signal representing an arithmetic average of the original signal from each row of a field and an original signal from a next row of the same field, and d. means for supplying said original signal as an output signal during reading of said field and for supplying said signal representing the arithmetic average signal as an output signal during reading of the other field.

2. A television camera to claim 1, in which the original signal represents a brightness signal.

3. A television camera comprising a. An image sensor comprising an array of elements disposed in rows which correspond to horizontal scanning lines of an odd and an even-numbered field of a television signal, each of the elements being responsive to excitation by light to produce and store an electric charge, and means for successively reading said charge as an electric voltage or current corresponding to the charge from each row of the elements within a time interval corresponding to the period of one horizontal scanning line, b. means for providing said elements with color selectivity, by means of which the elements in each of the rows have a response to light of different color components which varies from element to element in the same sequence for each row, c. means for obtaining an original color signal from said reading means, d. means for forming a color signal representing an arithmetic average of the original color signal from each row of a field and an original color signal from a next row of the same field, and e. means for supplying said original color signal as an output signal during reading of said field and for supplying said color signal representing the arithmetic average signal as an output signal during reading of the other field.

4. A television camera comprising a. an image sensor comprising an array of elements disposed in rows which correspond to horizontal scanning lines of an odd and an even-numbered field of a television signal, each of the elements being responsive to excitation by light to produce and store an electric charge, and means for successively reading said charge as an electric voltage or current corresponding to the charge from each row of the elements within a time interval correspondng to the period of one horizontal scanning line, b. means for provising said elements with color selectivity, by means of which the elements disposed in different rows have predetermined responses to light of different color components such that the entire array of rows constitutes a repeated pattern of a plurality of rows having different responses, c. means for obtaining an original color signal as a line sequential color signal from said reading means, d. means for forming a color signal representing an arithmetic average of the original color signal from each row and an original color signal from a next row having a same color response as the first mentioned row, and e. means for supplying said original color signal as an output signal during reading of one field and for supplying said color signal representing the arithmetic average signal as an output signal during reading of the other field.

5. A television camera comprising a. an image sensor comprising an array of elements disposed in rows which correspond to horizontal scanning lines of an odd and an even-numbered field of a television signal, each of the elements being responsive to excitation by light to produce and store an electric charge, and means for successively reading said charge as an electric voltage or current corresponding to the charge from each row of the elements within a time interval corresponding to the period of one horizontal scanning line, b. means for providing said elements with color selectivity, by means of which the elements disposed in different rows have predetermined responses to light of different color components such that the entire array of rows constitutes a repeated pattern of a plurality of rows having different responses, c. means for obtaining an original color signal as a line sequential color signal from said reading means, d. means for dividing the line sequential color signal into individual color component signals, each color component signal consisting of a series of spaced segment signals of a selected color component each having a duration corresponding to the period of one horizontal scanning line, e. means for forming a first composite signal comprising a series of segment signals of a selected color component with a compensation signal inserted between adjacent ones of the segment signals, the compensation signal being related to the adjacent segment signals, f. means for delaying the first composite signal by a time period corresponding to the period of one horizontal scanning line, thereby providing a delayed signal, g. means for forming a second composite signal which represents an arithmetic average of the first composite signal and the delayed signal, and h. means for supplying said first composite signal as an output signal during reading of one field and for supplying said second composite signal as an output signal during reading of the other field.

6. A television camera according to claim 5, in which the compensation signal corresponds to an arithmetic average of its adjacent two segment signals.

7. A television camera comprising a. an image sensor comprising a photosensitive region including elements disposed in rows and columns, each of the elements being responsive to excitation by light to produce and store an electric charge, and means for successively reading said charge as an electric voltage or current correspondng to the charge from each row of the elements within a time interval corresponding to the period of one horizontal scanning line, b. means for providing said elements with color selectivity, by means of which the elements disposed in different rows have predetermined responses to light of different color components such that the entire array of rows constitutes a repeated pattern of a plurality of rows having different responses, c. means for obtaining an original color signal as a line sequential color signal from said reading means, d. means for dividing the line sequential color signal into individual color component signals, each color component signal consisting of a series of spaced segment signals of a selected color component each having a duration corresponding to the period of one horizontal scanning line, e. means for forming a composite signal comprising a series of segmented signals of a selected color component with a compensation signal inserted between adjacent ones of the segment signals, the compensation signal corresponding to an arithmetic average of its adjacent two segment signals, and f. means for supplying said composite signal as an output signal.

8. A television camera comprising a. an image sensor comprising a photosensitive region including elements disposed in rows and columns, each of the elements being responsive to excitation by light to produce and store an electric charge, and means for successively reading said charge as an electric voltage or current corresponding to the charge from each row of the elements within a time interval corresponding to the period of one horizontal scanning line, b. means for providing said elements with color selectivity, by means of which the elements disposed in each row have a predetermined response to light of diffeent color components, c. means for obtaining an original color signal as a dot sequential color signal from said reading means, d. means for dividing the dot sequential color signal into individual color component signals, each color component signal consisting of a series of spaced segment signals of a selected color component each having a duration corresponding to the period during which said charge stored in each of the elements is transferred to each of the successive elements, e. means for forming a composite signal comprising a series of segment signals of a selected color component with a compensation signal inserted between adjacent ones of the segment signals, the compensation signal corresponding to an arithmetic average of its adjacent two segment signals, and f. means for supplying said composite signal as an output signal.

9. A television camera comprising a. an image sensor comprising a photosensitive region including elements disposed in rows and columns, each of the elements being responsive to excitation by light to produce and store an electric charge, and means for successively reading said charge as an electric voltage or current corresponding to the charge from each row of the elements within a time interval corresponding to the period of one horizontal scanning line, b. means for obtaining a signal from said reading means, the signal consisting of a series of spaced segment signals each having a duration corresponding to the period of one horizontal scanning line, c. means for forming a composite signal comprising a series of segment signals with a compensation signal inserted between adjacent ones of the segment signals, the compensation signal corresponding to an arithmetic average of its adjacent two segment signals, and d. means for supplying said composite signal as an output signal.

* * * * *